(12) United States Patent
Takeda

(10) Patent No.: US 6,446,916 B2
(45) Date of Patent: Sep. 10, 2002

(54) CLAMP FOR FASTENING LONG BODY

(75) Inventor: Ikuo Takeda, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/819,623

(22) Filed: Mar. 29, 2001

(30) Foreign Application Priority Data

Apr. 6, 2000 (JP) ..................................... 2000-105059

(51) Int. Cl.[7] ................................................ F16L 3/08
(52) U.S. Cl. ..................... 248/74.2; 403/187; 248/74.1; 248/74.3
(58) Field of Search ............................. 248/71, 73, 49, 248/74.1, 74.2, 74.3, DIG. 903, 68.1; 411/508, 509, 510, 913; 403/326, 327, 329

(56) References Cited

U.S. PATENT DOCUMENTS

| | | | | |
|---|---|---|---|---|
| 4,295,618 A | * | 10/1981 | Morota et al. | ................. 248/73 |
| 4,589,794 A | * | 5/1986 | Sugiura et al. | ............. 403/187 |
| 4,669,156 A | * | 6/1987 | Guido et al. | ................... 24/336 |
| 5,947,426 A | * | 9/1999 | Kraus | .......................... 248/74.2 |
| 6,206,330 B1 | * | 3/2001 | Oi et al. | ...................... 248/68.1 |

FOREIGN PATENT DOCUMENTS

| | | |
|---|---|---|
| JP | 62-194912 | 12/1987 |
| JP | 6-63977 | 9/1994 |

* cited by examiner

Primary Examiner—Lynne H. Browne
Assistant Examiner—Michael P Ferguson
(74) Attorney, Agent, or Firm—Finnegan, Henderson, Farabow, Garrett & Dunner, L.L.P.

(57) ABSTRACT

A clamp has a plate-like base 1, a connection leg 2 disposed on a back surface of the base 1 for connecting the base 1 to the panel P, an auxiliary leg 3 provided for substantially constantly maintaining a gap between the base 1 and the panel P generated by the connection leg 2, and a sandwiching portion 4 standing on a front surface of the base 1 and having one and other columns 41 and 42 from which locking projections 4a serving as pull-out preventing members for the long body (cable) c are projecting such as to be opposed to each other, wherein the back surface of the base 1 is provided at a position thereof corresponding to the sandwiching portion 4 with a rib 5 having a height abutting against the panel P.

5 Claims, 4 Drawing Sheets

CLAMP FOR FASTENING LONG BODY

BACKGROUND OF THE INVENTION

1. Field of the Invention

The present invention relates to a clamp for fastening a long body such as a cable and hose to a panel.

2. Description of the Related Art

As a clamp of this type, one shown in FIG. 1 is proposed (not prior art). This clamp comprises a flat-plate like base 1, a connection leg 2 disposed on a back surface of the base 1 for connecting the base 1 to a panel P, an auxiliary leg 3 for substantially constantly maintaining a gap between the base 1 and the panel P caused by the connection leg 2, and a sandwiching portion 4 standing on a front surface of the base 1 and having a column 41. Locking portions 4a serving for preventing a cable (wire) C as a long body from being pulled out are projecting from the column 41 such as to be opposed to each other.

The connection leg 2 includes a projection 2a for preventing the connection leg 2 from being pulled out after the connection leg 2 is inserted into a through hole (not shown) of the panel P. The connection leg 2 also includes a skirt 2b for maintaining a predetermined gap between the base 1 and the panel P such that the gap is opened.

The sandwiching portion 4 includes first to third columns 41 to 43 standing from the base 1 directly. The sandwiching portion 4 can hold the cable C if the sandwiching portion 4 has two columns, i.e., one-side column and the other-side column, but if the sandwiching portion 4 has three or more columns as the one-side column and the other-side column disposed alternately, the sandwiching portion 4 can hold a plurality of adjacent cables 4.

Opposed surfaces of the first and second columns 41 and 42 are provided with locking projections 4a at upper and lower two positions. Opposite surfaces of the second and third columns 42 and 43 are provided with locking projections 4a at upper end positions. Therefore, upper and lower two cables C can be held between the first and second columns 41 and 42, and one cable C can be held between the second and third columns 42 and 43.

In the conventional clamp, if an attempt is made to insert the cable C between the first and second columns 41 and 42 or between the second and third columns 42 and 43, as shown in Fig.2, the base 1 is curved into a recess shape by an insertion resistance of the locking portions 4a. Therefore, there is a problem that a distance between tip ends of the first and second columns 41 and 42 or a distance between tip ends of the second and third columns 42 and 43 is narrowed, and it is difficult to insert the cable C.

SUMMARY OF THE INVENTION

The present invention has been accomplished to solve the above problem, and it is an object to provide a clamp capable of easily inserting a cable between columns.

To achieve the above object, according to a first aspect of the invention, there is provided a clamp for fastening a long body such as a cable and a hose to a panel, comprising: a plate-like base, a connection leg disposed on a back surface of the base for connecting the base to the panel, an auxiliary leg provided for substantially constantly maintaining a gap between the base and the panel generated by the connection leg, and a sandwiching portion standing on a front surface of the base and having one and other columns from which locking projections serving as pull-out preventing members for the long body are projecting such as to be opposed to each other, wherein the back surface of the base is provided at a position thereof corresponding to the sandwiching portion with a rib having a height abutting against the panel.

According to a second aspect of the invention, the rib has a first rib which extends on the back surface of the base such as to connect the one column and the other column.

According to a third aspect of the invention, the one column and the other column is formed of wall-like members opposed to each other in parallel, the rib has a first rib which is on the back surface of the base and which intersects the one column and the other column and extends such as to connect these columns to each other.

According to a fourth aspect of the invention, one end of the first rib reaches the auxiliary leg.

According to a fifth aspect of the invention, the rib includes a second rib provided on the back surface of the base between the one and the other columns.

According to a sixth aspect of the invention, the one column and the other column is formed of wall-like members opposed to each other in parallel, the rib includes a second rib located between the one and the other columns on the back surface of the base and extending in parallel to the columns.

According to a seventh aspect of the invention, the auxiliary leg and the first and second ribs are integrally connected to each other.

In the first aspect of the invention, since the back surface of the base is provided at a position thereof corresponding to the sandwiching portion with a rib having a height abutting against the panel, even if a resistance is generated when the long body is inserted between the columns by the locking projection, the base is not curved toward the panel. Thus, columns are inclined in such a direction that tip ends of the columns are separated from each other and thus, it is easy to insert the long body between the columns.

In the second aspect, the rib has the first rib which extends on the back surface of the base such as to connect the one column and the other column. Thus, it is possible to prevent the base from being curved toward the panel at least between the columns. That is, the rib may be short in length between the columns (first rib), the cost can be reduced. The first rib can prevent the columns from being inclined in such a direction that the columns are separated from each other, the holding force of the long body by the columns and the locking projection can be increased.

In the third aspect, the one column and the other column is formed of wall-like members opposed to each other in parallel, the rib has a first rib which is on the back surface of the base and which intersects the one column and the other column and extends such as to connect these columns to each other. Thus, the holding force of the long body by the columns and the locking projection can further be increased, and the length of the first rib can be minimized.

In the fourth aspect, one end of the first rib reaches the auxiliary leg. Thus, the first rib functions as a member for reinforcing the auxiliary leg, and the leg functions as a member for reinforcing the rib. Thus, the strength of each of the first rib, auxiliary leg and the base can be enhanced. As a result, the holding force of the long body by the columns and the locking projection can be enhanced.

In the fifth aspect, the rib includes a second rib provided on the back surface of the base between the one and the other columns. Thus, the base is curved such that the opposite sides of the second rib approach the panel by the resistance acting on the locking projection when the long body is inserted. Thus, columns are inclined in such a direction that tip ends of the columns are separated from each other and thus, it is extremely easy to insert the long body between the columns.

When the long body is pulled out between the columns, a portion of the base is curved such that the portion of the second rib sides is separated away from the panel by the resistance acting on the locking portion. Thus, the tip end of the third column approaches the second column and therefore, the resistance of the locking portion when the long body is pulled out from the columns is increased. Therefore, the holding force of the long body by the column and the locking portion can be enhanced.

In the six aspect of the invention, the one column and the other column is formed of wall-like members opposed to each other in parallel, the rib includes a second rib located between the one and the other columns on the back surface of the base and extending in parallel to the columns. Thus, the inclination of the third column generated by the resistance of the locking portion becomes substantially constant in the widthwise direction thereof (in a direction in which the long body extends). Thus, the holding force of the long body by the locking portions is substantially uniformized in the widthwise direction of the columns.

In the-seventh aspect of the invention, since the auxiliary leg and the first and second ribs are integrally connected to each other, each of them functions as a reinforcing member for the other one. Thus, the strength of the auxiliary leg, the first and second ribs can be enhanced, and the strength of the base can also be enhanced. As a result, the holding force of the long body by the columns and the locking portions can be enhanced.

DESCRIPTION OF THE PREFERRED EMBODIMENT

Figure 1:
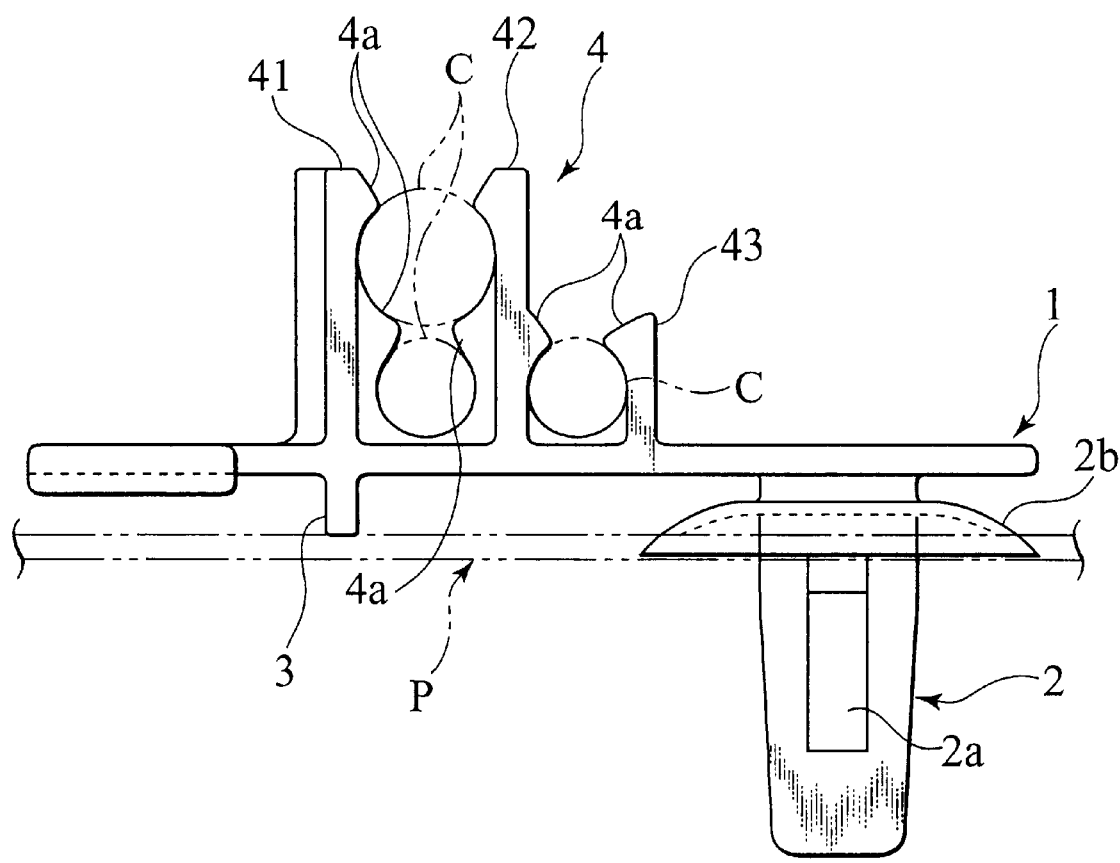
FIG. 1 is a front view of a proposed clamp.
Figure 2:
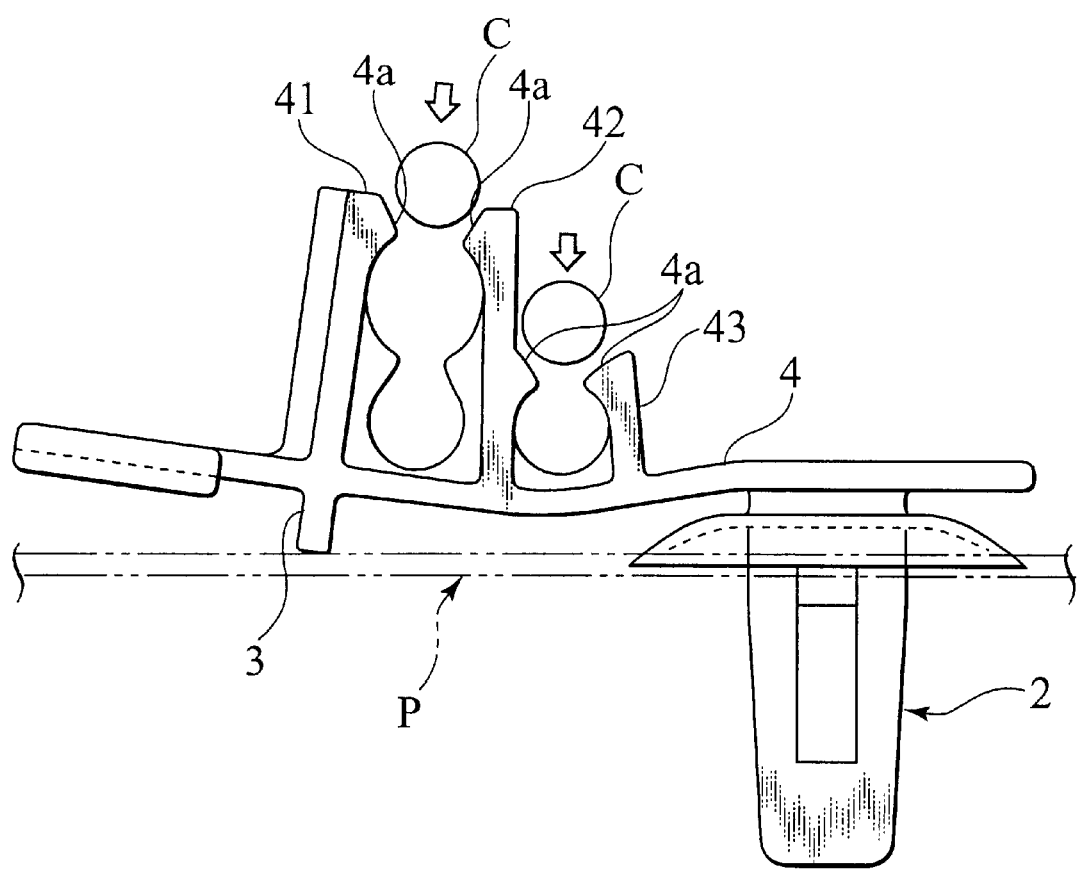
FIG. 2 is a front view showing a problem of the clamp shown in FIG. 1.

An embodiment of the present invention will be explained with reference to FIGS. 3 and 4 hereinafter. The same elements as constituent elements in FIGS. 1 and 2 are designated with the same symbols, and explanation thereof is omitted.

Figure 3:
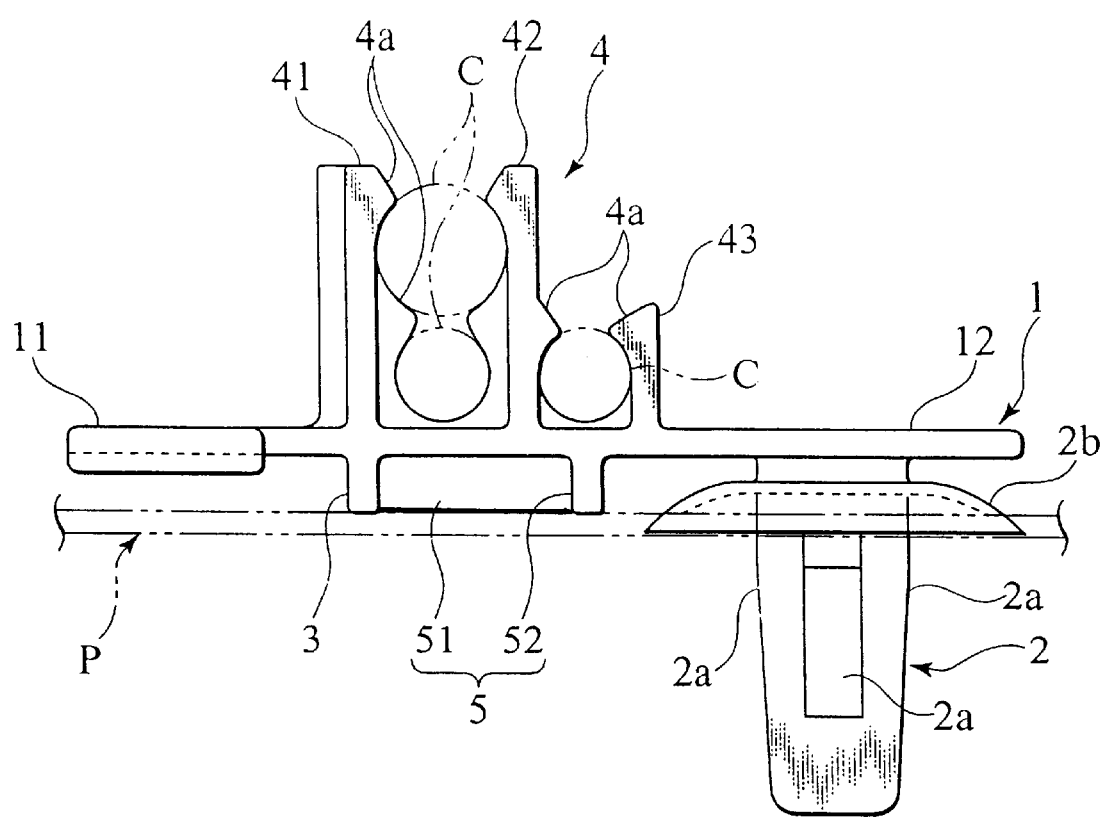
FIG. 3 is a front view of a clamp shown as an embodiment of the present invention.
Figure 4:
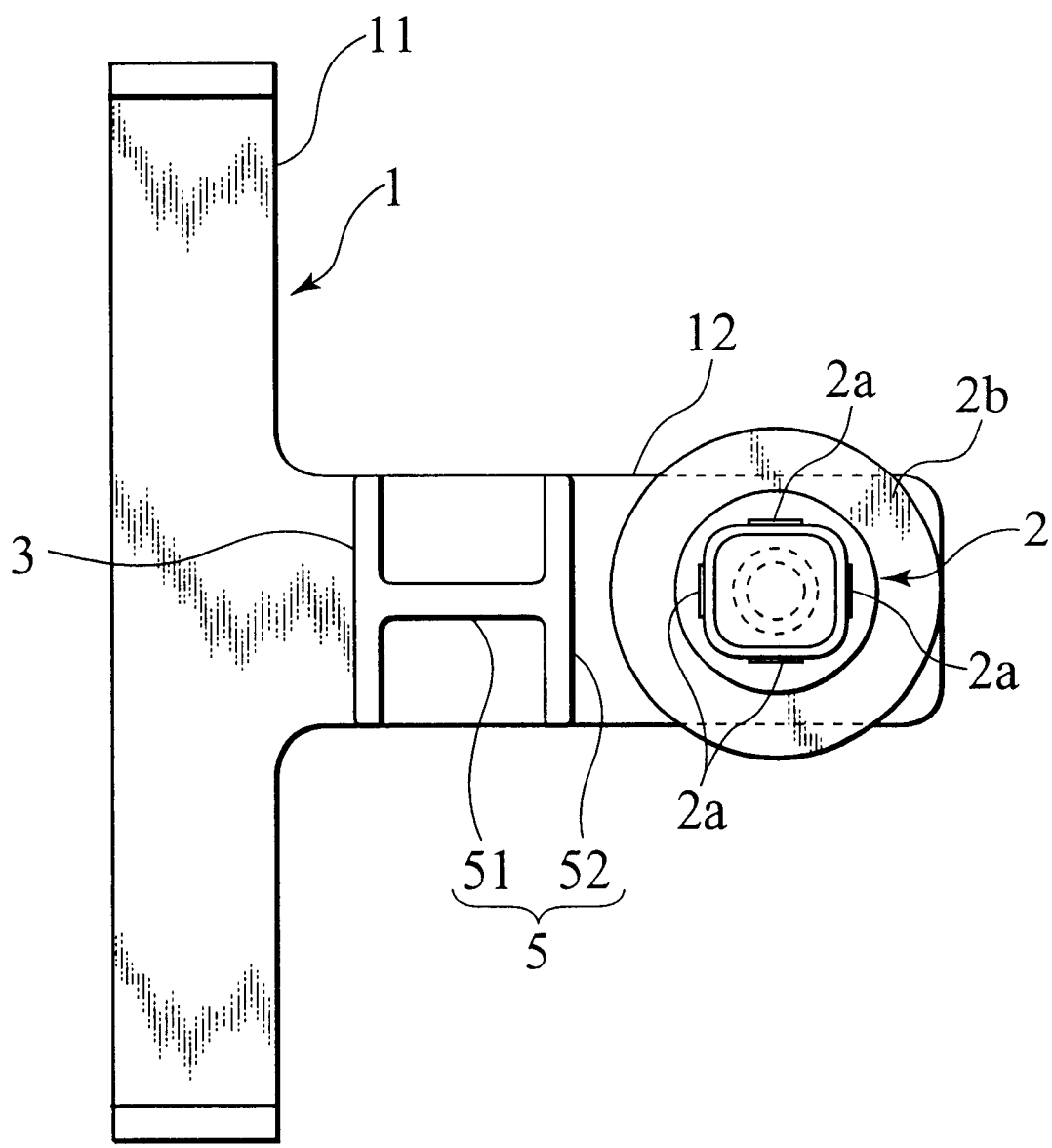
FIG. 4 is a bottom view of the clamp shown in FIG. 3.

As shown in FIGS. 3 and 4, in a clamp of this embodiment, a base 1 is formed into a T-shape comprising a horizontal plate 11 having a predetermined width and a vertical plate 12 perpendicularly crossing a central portion of the horizontal plate 11. A connection leg 2 is located closer to a tip end of a back surface of the vertical plate 12, and the connection leg 2 is provided on a center line in a widthwise direction of the vertical plate 12. An auxiliary leg 3 is provided closer to a base of the vertical plate 12 closer to the horizontal plate 11. The auxiliary leg 3 intersects (in parallel to the horizontal plate 11) the center line, and extends over the entire width of the back surface of the vertical plate 12. The auxiliary leg 3 holds the base 1 in parallel at a predetermined distance from a panel P in corporation with the connection leg 2.

On the other hand, the sandwiching portion 4 is provided from the connection leg 2 to the auxiliary leg 3 on the surface of the vertical plate 12. A rib 5 having a height abutting against the panel P is provided on the back surface of the base 1 corresponding to the position of the sandwiching portion 4.

First to third columns 41 to 43 project perpendicularly from the surface of the vertical plate 12 and formed of walls opposed to each other in parallel. The columns 41 to 43 intersect the center line of the vertical plate 12 and extend over the entire width of the vertical plate 12. A locking projection 4a is extended over the entire width of each of the columns 41 to 43. The first column 41 is disposed directly above the auxiliary leg 3, and the second and third columns 42 and 43 are disposed closer to the connection leg 2 in this order.

The rib 5 includes a first rib 51 and a second rib 52. The first rib 51 is located on the center line of the vertical plate 12, and intersects the first and second columns 41 and 42, and extends such as to connect the first and second columns 41 and 42. One end of the first rib 51 reaches the auxiliary leg 3.

The second rib 52 is located at a center between the second and third columns 42 and 43 and extends in parallel to the second and third columns 42 and 43, and extends over the entire width of the vertical plate 12. The other end of the first rib 51 extends to a position of the second rib 52.

Each of the first and second ribs 51 and 52 has substantially the same thickness as those of the base 1, the auxiliary leg 3 and the columns 41 to 43 and the first and second ribs 51 and 52 are integrally formed with them. The auxiliary leg 3 and the first and second ribs 51 and 52 are formed integrally into an H-shape on the back surface of the vertical plate 12. The base 1, the connection leg 2, the auxiliary leg 3 and the columns 41 to 43 and the first and second ribs 51 and 52 are integrally formed of resin as the clamp by injection molding.

In the clamp having the above structure, the first rib 51 is provided on the back side of the base 1 such as to connect the first and second columns 41 and 42. Therefore, when the cable C is inserted between the first and second columns 41 and 42 by the locking portions 4a, even if resistance is generated, the base 1 is not curved toward the panel P. Thus, since the columns 41 and 42 are not inclined such that their tip ends approach each other, the cable C can easily be inserted between the columns 41 and 42.

The first rib 51 may be short for merely connecting the first and second columns 41 and 42 only if the first rib 51 can prevent the first and second columns 41 and 42 from being inclined. In this case, since the first rib 51 may be short, the cost thereof can be reduced. Further, since the columns 41 and 42 can be prevented from being inclined in a direction away from each other by the first rib 51, the holding force of the cable C by the locking portion 4a can be increased. Further, since each of the columns 41 and 42 is formed of the wall-like member, the locking portions 4a extend over the entire width of the columns 41 and 42, the holding force of the cable C by the columns 41 and 42 as well as the locking portions 4a can be increased.

On the other hand, the second rib 52 is provided between the second and third columns 42 and 43, the base 1 is curved such that the third column 43 approaches the panel P with respect to the second rib 52 by the resistance acting on the locking portion 4a when the cable C is inserted between the columns 42 and 43 (when the first rib 51 is not provided, opposite sides of the second rib 52 in the base 1 are curved such as to approach the panel P to the same extent). Therefore, the third column 43 is inclined in such a direction that the tip end of the column 43 is separated away from the second column 42. Thus, it becomes extremely easy to insert the cable C between the columns 42 and 43.

When the cable C is pulled out between the columns 42 and 43, a portion of the base 1 closer to the third column 43 is curved such that the portion is separated away from the panel P by the resistance acting on the locking portion 4*a*. Thus, the tip end of the third column 43 approaches the second column 42 and therefore, the resistance of the locking portion 4a when the cable C is pulled out from the columns 42 and 43 is increased. Therefore, the holding force of the cable C can be enhanced. Further, since the second rib 52 extends in parallel to the columns 42 and 43, the inclination of the third column 43 generated by the resistance of the locking portion 4*a* becomes substantially constant in the widthwise direction thereof (in a direction in which the cable C extends). Thus, the holding force of the cable C by the locking portions 4*a* is substantially uniformized in the widthwise direction of the columns 42 and 43. Thus, the cable C an be held stably.

Further, since the auxiliary leg 3, the first and second ribs 52 and 53 are integrally connected to each other, each of them functions as a reinforcing member for the other one. Thus, the strength of the auxiliary leg 3, the first and second ribs 51 and 52 can be enhanced, and the strength of the base 1 can also be enhanced. As a result, the holding force of the cable C by the columns 41 to 43 and the locking portions 4*a* can be enhanced.

Although the cable C is shown as the long body in the above embodiment, a hose, a pipe or other object may be used as the long body of course.

What is claimed is:

1. A clamp for fastening an elongated body to a panel, comprising:

a plate-like base having an upper surface and a lower surface;

a connection leg disposed on the lower surface for connecting the base to the panel with a predetermined distance between the panel and the base;

an auxiliary leg disposed on the lower surface and abutting the panel for maintaining the predetermined distance;

a sandwiching portion disposed on the upper surface and having a first column and a second column aligned substantially parallel to each other for receiving the elongated body therebetween, each of the first column and the second column including at least one locking projection;

a first rib disposed on the lower surface so as to be substantially perpendicular to the auxiliary leg and having a height abutting against the panel; and a second rib disposed on the lower surface so as to be substantially parallel to the auxiliary leg and having a height abutting against the panel, wherein the first rib is formed on the lower surface so as to connect the auxiliary leg with the second rib.

2. A clamp according to claim 1, wherein the auxiliary leg, the first rib, and second rib are formed into one body with the base.

3. A clamp according to claim 1, wherein the sandwiching portion further includes a third column aligned substantially parallel to the second column for receiving the elongated body therebetween, the third column including at least one locking projection.

4. A clamp according to claim 3, wherein the auxiliary leg is positioned on the lower surface at location substantially below the first column.

5. A clamp according to claim 4, wherein the second rib is positioned on the lower surface at location substantially between the second column and the third column.

* * * * *